United States Patent [19]
Georges et al.

[11] Patent Number: 5,412,047
[45] Date of Patent: * May 2, 1995

[54] HOMOACRYLATE POLYMERIZATION PROCESSES WITH OXONITROXIDES

[75] Inventors: Michael K. Georges, Guelph; Marko D. Saban, Etobicoke; Peter M. Kazmaier, Mississauga; Richard P. N. Veregin, Mississauga; Gordon K. Hamer, Mississauga; Karen A. Moffat, Brantford, all of Canada

[73] Assignee: Xerox Corporation, Stamford, Conn.

[*] Notice: The portion of the term of this patent subsequent to Jun. 21, 2011 has been disclaimed.

[21] Appl. No.: 242,490

[22] Filed: May 13, 1994

[51] Int. Cl.$^6$ .......................... C08F 2/06; C08F 4/28
[52] U.S. Cl. .................................. 526/204; 526/220
[58] Field of Search .............. 526/204, 206, 213, 225, 526/219.2, 220

[56] References Cited

U.S. PATENT DOCUMENTS

| | | | |
|---|---|---|---|
| 4,546,160 | 10/1985 | Brand et al. | 526/320 |
| 4,581,429 | 4/1986 | Solomon et al. | 526/220 |
| 4,736,004 | 4/1988 | Scherer, Jr. et al. | 526/206 |
| 5,059,657 | 10/1991 | Druliner et al. | 525/244 |
| 5,268,437 | 12/1993 | Holy et al. | 526/229 |
| 5,322,912 | 6/1994 | Georges | 526/204 |

Primary Examiner—Christopher Henderson
Attorney, Agent, or Firm—John L. Haack

[57] ABSTRACT

A polymerization process for the preparation of homopolymeric acrylate containing thermoplastic resin or resins comprising heating a mixture comprised of a free radical initiator, an oxo nitroxide stable free radical agent, at least one polymerizable acrylate monomer compound, and optionally a solvent, to form a homopolymeric acrylate containing thermoplastic resin or resins with a high monomer to polymer conversion and a narrow polydispersity.

36 Claims, No Drawings

HOMOACRYLATE POLYMERIZATION PROCESSES WITH OXONITROXIDES

CROSS REFERENCE TO COPENDING APPLICATIONS AND ISSUED PATENTS

Attention is directed to commonly owned and assigned [Application Number U.S. Ser. No. 07/976,604, (D/92579) filed Nov. 16, 1992,] U.S. Pat. No. 5,322,912, issued Jun. 21, 1994, entitled "POLYMERIZATION PROCESSES AND THEIR TONER COMPOSITIONS THEREFROM", [now U.S. Patent No., (Allowed December/1993, not yet assigned]; and [Application Number U.S. Ser. No. 08/000,078 [(D/91666), filed Jan. 4], 1994] U.S. Pat. No. 5,312,704, issued May 17, 1994, entitled "Monomodal, Monodispersed Toner Compositions and Imaging Processes", wherein there is illustrated a toner composition comprised of pigment particles, and a resin comprised of a monomodal polymer resin or monomodal polymer resin blends and wherein the monomodal resin or resin blends possess a narrow polydispersity.

Attention is directed to commonly owned and assigned copending applications Application Numbers, U.S. Ser. No. 08/181,134 [(D/92579D)], filed Jan. 4, 1994; U.S. Ser. No. 08/307,192 [(D/92581)], filed Mar. 25, 1993; continuation-in-part of U.S. Ser. No. 07/976,604, (D/92579)] filed Nov. 16, 1992, U.S. Ser. No. 08/214,518, [(D/925791)] filed Mar. 18, 1994, entitled "EMULSION POLYMERIZATION PROCESSES AND TONER COMPOSITIONS THEREFROM"; and U.S. Ser. No. [(not yet assigned), (D/93729)] 08/223,418 filed [(not yet assigned)] Apr. 4, 1994, entitled "AQUEOUS POLYMERIZATION PROCESSES".

The disclosures of the above mentioned patents and copending applications are incorporated herein by reference in their entirety.

BACKGROUND OF THE INVENTION

The present invention is generally directed to processes for the preparation of homopolymers of acrylic monomers and to copolymers containing homoacrylate segments. More specifically, the present invention relates to polymerization processes which provide homoacrylate and copolymeric acrylate resin products which possess narrow polydispersity properties and which polymerization processes proceed with high monomer to polymer conversion. In particular, this invention relates to acrylate polymerization processes which yield homoacrylate and copolymers containing homoacrylate segments having number average molecular weights ($M_n$) above about 100 to about 1,000 and having a polydispersity ratio of the weight average molecular weight ($M_w$) to the number average molecular weight ($M_n$) of from about 1.0 to about 2.0.

The present invention provides in embodiments a pseudoliving polymerization process that enables the synthesis of narrow polydispersity homoacrylate and copolymeric acrylate resins from acrylate and acrylate derivative monomers. The process can, in embodiments, use known free radical initiators in combination with an oxygenated stable free radical agent and acrylate monomers to afford narrow polydispersity homoacrylate and copolymeric acrylate resins.

In other embodiments the acrylate polymerization processes of the present invention can be used to prepare block copolymers and multi-block polymer having narrow polydispersity properties wherein at least one of the blocks is optionally water soluble and subsequently added blocks or segments may be only partially or entirely water insoluble thereby providing a means for preparing surface active or surfactant materials having well defined polydispersity and hydrophobe-lipophobe balance (HLB) properties.

Many polymerization processes used for the synthesis of narrow polydispersity acrylate and related resins, such as anionic, cationic, and group transfer polymerization processes, are severely limited by the need for anhydrous reaction conditions and monomers which do not contain protic or reactive functional groups, for example, hydroxy (OH) carboxy ($CO_2H$), amino (NH), and the like. As a consequence, these processes are not readily applicable to the polymerizaton of acrylate monomers since these monomer materials tend to be hydroscopic and any associated water may readily destroy the polymerization initiator component, for example, the hydrolysis or protonation of organolithium reagents, or in other ways cause the polymerization to fail entirely or to be industrially inefficient.

Conventional free radical polymerization processes that are used to polymerize acrylate monomers inherently give broad polydispersity resin products or require that sophisticated processing conditions and materials handling protocols be employed.

The polymer resins produced by processes of the present invention, in embodiments, are essentially monomodal, that is the molecular weight distribution is narrow and indicative of a Poisson character and without shoulders or side bands. In embodiments, by repeating the heating step, comprising the combined initiation and polymerization step, there is provided a means for obtaining monomodal mixtures of polymer resins that are compositionally the same resin type having characteristics of both narrow polydispersity and known or selectable modality greater than 1. In embodiments, the process of the instant invention provides a means for conducting homoacrylate polymerization processes on multikilogram or larger scales. The aforementioned embodiments may be accomplished in a one or single pot reactor environment. In embodiments, polymeric chain growth proceeds by a pseudoliving mechanism and can provide resins of variable molecular weights from very low to very high, for example, less than about 2,000 up to about 200,000 while maintaining narrow molecular weight distributions or polydispersities. In embodiments, block and multi-block copolymers can be synthesized by the aforementioned stable free radical moderated homoacrylate polymerization processes wherein each block formed is well defined in length by the sequentially added and reacted monomer and wherein each additional block that is formed also possesses a narrow molecular weight distribution.

It is generally accepted that known anionic and cationic polymerization processes used for the preparation of narrow polydispersity resins, block and multiblock polymers are not believed possible in aqueous or protic solvent containing polymerization media, or the aforementioned protonic or reactive functional groups, reference the aforementioned copending application number U.S. Pat. No. 5,312,704. The present invention enables the preparation of homoacrylate containing block and multi-block copolymers which preparation was heretofore not achievable in stable free radical moderated, free radical initiated polymerization systems.

Of the known polymerization processes a preferred way to prepare polymers or copolymers having a narrow molecular weight distribution or polydispersity is by anionic processes. The use and availability of resins having narrow polydispersities in industrial applications is limited because anionic polymerization processes must be performed in the absence of atmospheric oxygen and moisture, require difficult to handle and hazardous initiator reagents, and consequently such polymerization processes are generally limited to small batch reactors. In addition, the monomers and solvents that are used must be of high purity and anhydrous thereby rendering the anionic process more expensive than alternatives which do not have these requirements. Thus, anionic polymerization processes are difficult and costly. It is desirable to have free radical polymerization process that provides narrow molecular weight distribution homoacrylate containing resins that overcomes the shortcomings and disadvantages of the aforementioned anionic polymerization processes.

Similarly, group transfer polymerization (GTP) processes have limitations and disadvantages, such as anhydrous reaction conditions and expensive reagents, which disadvantage GTP processes for large scale industrial applications.

Free radical polymerization processes are generally chemically less sensitive than anionic processes to impurities in the monomers or solvents typically used and are substantially or completely insensitive to water. There has been a long felt need for an economical free radical polymerization process which is suitable for preparing narrow polydispersity resins by aqueous processes.

Acrylate polymerization processes known in the art proceed by a free radical mechanism providing resins of broad polydispersities and generally high molecular weights. The present invention relates to homoacrylate and copolymeric acrylate polymerization processes that proceeds via a pseudoliving free radical mechanism and provides homoacrylate containing resins of high, intermediate, or low molecular weights and with narrow polydispersities. The present invention provides product resins with a latent thermally reactive functional group on at least one end which can be used for further reaction to prepare other resins with complex architectures. The present invention, in embodiments, provides polymerization processes that enable control of resin molecular weight, weight distribution, modality of the products, and the like properties.

Acrylate polymerization processes are industrially important, and are used for the synthesis of numerous copolymers, for example, deflocculating or dispersent polymers. However, resins prepared by known acrylate polymerization processes typically have broad polydispersities and high molecular weights. When low molecular weight resins were required, a chain transfer agent is typically added to limit the extent of chain growth by way of premature chain termination events and which agent is, for example, an unpleasant smelling thiol. Polymers prepared by thiol type chain transfer mediated polymerization processes are irreversibly terminated with functional groups, such as alkyl sulfides, which preclude further free radical reactions and therefore limits the utility of the polymer resin products produced therefrom.

The present invention is directed to pseudoliving homoacrylate polymerization processes which permit the economic preparation of homoacrylate and copolymeric acrylate containing narrow polydispersity resins with low, intermediate, or high molecular weights. The low molecular weight resins can be prepared without a chain transfer agent or molecular weight modifier which provides several advantages over conventional chain transfer mediated polymerization processes.

Copolymers prepared by free radical polymerization processes inherently have broad molecular weight distributions or polydispersities, generally greater than about four. One reason is that most free radical initiators selected have half lives that are relatively long, from several minutes to many hours, and thus the polymeric chains are not all initiated at the same time and which initiators provide growing chains of various lengths at any time during the polymerization process. Another reason is that the propagating chains in a free radical process can react with each other in processes known as coupling and disproportionation, both of which are chain terminating and polydispersity broadening reaction processes. In doing so, chains of varying lengths are terminated at different times during the reaction process which results in resins comprised of polymeric chains which vary widely in length from very small to very large and thus have broad polydispersities. If a free radical polymerization process is to be enabled for producing narrow molecular weight distributions, then all polymer chains must be initiated at about the same time and premature termination by coupling or disproportionation processes must be avoided or eliminated.

Contemporary environmental issues and pollution concerns are prompting greater use of certain biodegradable polymers, among these are water soluble polymers as described by F. Lo, J. Petchonka, J. Hanly, Chem. Eng. Prog., July, 1993, p. 55–58, the disclosure of which is incorporated by reference herein in its entirety. In embodiments of the present invention are provided water soluble and biodegradable polymeric resins.

In other applications, such as water treatment, it is particularly important that polymer products have a narrow molecular weight distribution, that is, low polydispersity. In conventional free radical polymerization processes, polydispersity rises rapidly as the high molecular weight fraction of the polymer mixture increases. In many processes designed to produce low molecular weight polymers, high molecular weight fractions are observed because there is insufficient control over chain-chain coupling and branching. These high molecular weight fractions tend to dominate the viscosity characteristics of the polymer product and can detract from polymer performance. Other processes designed to produce low molecular weight polymers result in the formation of excessive amounts of oligomeric products, for example, dimers and trimers, which can also detract from the polymer performance. These by-products do not have as much of an affect on the viscosity characteristics of the polymer mixture. However, they do affect the number average molecular weight such that it is no longer indicative of the properties of the polymer product.

In addition to chain-chain coupling and branching, processes for producing low molecular weight polymer products tend to have high polydispersities resulting from the methods used to reduce the residual monomer content of the polymer product. Methods of reducing the residual monomer content of the polymer mixture include post-polymerization processing which employs additional initiator, extended periods at elevated temperatures, and use of comonomeric scavengers. These methods tend to broaden the molecular weight distribution or polydispersity. Therefore, unless the polymer mixture has a sufficiently low polydispersity to begin with, the above mentioned methods used to reduce residual monomer content will raise polydispersity of the product to an unacceptable level.

Practitioners in the art have long sought an inexpensive, efficient and environmentally efficacious means for producing polymers having operator controllable or selectable molecular weight properties and further processes which selectively afford a wide variety of different polymer product types and have narrow molecular weight distribution properties.

In the aforementioned U.S. Pat. No. 5,322,912 there is disclosed free radical polymerization processes for the preparation of a thermoplastic resin or resins comprising: heating from about 100° to about 160° C. a mixture comprised of a free radical initiator, a stable free radical agent, and at least one polymerizable monomer compound to form the thermoplastic resin or resins with a high monomer to polymer conversion and a narrow polydispersity. A broad spectrum of free radical reactive monomers, including acrylate and acrylic acid derivatives, are suitable for use in the highly versatile polymerization process. However, while the aforementioned acrylic monomers were readily incorporated into various copolymer resins, for example, alternating copoly(styrene-n-butyl acrylate), it was not possible to prepare homopolymeric acrylate containing resins. Although not desired to be limited by theory, it is believed that the inability to form homoacrylate resins or polymeric segments was the result of a combination of factors including among others the irreversible termination of telomeric products, that is, initiator, monomer and stable free radical coupled products.

The following patents are of interest to the background of the present invention, the disclosures of which are incorporated by reference herein in their entirety:

In U.S. Pat. No. 5,268,437, to Holy, issued Dec. 7, 1993, discloses a high temperature aqueous processes for the polymerization of monoethylenically unsaturated carboxylic monomer to produce low molecular weight, water-soluble polymer products useful as detergent additives, scale inhibitors, dispersents and crystal growth modifies. Suitable monomers include acrylic acid, methacrylic acid, maleic acid, maleic anhydride, crotonic acid, and itaconic acid. The reactions are run at temperatures ranging from about 130° to 240° C., preferably from about 140° to about 230° C., with polydispersities less than 2.5. The process can be continuous, semicontinuous, or batch.

In U.S. Pat. No. 4,546,160, to Brand et al., issued Oct. 8, 1985, is disclosed a process to continuously bulk polymerize acrylic monomers to prepare low molecular weight, uniform polymers employing minor amounts of initiator and, optionally solvents, at short residence times and moderate reaction temperatures to provide high yields of a product with polydispersities less than 3, suitable for high solids applications.

U.S. Patent 4,581,429 to Solomon et al., issued Apr. 8, 1986, discloses a free radical polymerization process which controls the growth of polymer chains to produce short chain or oligomeric homopolymers and co-polymers including block and graft copolymers. The process employs an initiator having the formula (in part) =N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures of less than about 100 degrees C., and use multiple stages.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

U.S. Pat. No. 4,736,004 to Scherer, Jr. et al., issued Apr. 5, 1988, discloses novel persistent perfluorinated free radicals which, upon thermal decomposition, yield free radicals which can be used to polymerize polymerizable monomers containing ethylenic unsaturation.

Other references cited in an international search report for the aforementioned Application Number U.S. Pat. No. 5,322,912 are: *J. Am. Chem. Soc.*, 1983, 5706-5708; *Macromol.*, 1987, 1473-1488; *Macromol.*, 1991, 6572-6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976.

One method of achieving control of polymer molecular weight is through the use of efficient chain transfer agents, but this approach has several drawbacks. This approach irreversibly incorporates the structure of the chain transfer agent into the polymer chain. This can be undesirable since that structure will have an increasing effect on the properties of the polymer as molecular weight decreases. Furthermore, the chain transfer agents commonly employed are mercaptans. These materials are expensive and have objectionable odors associated with their presence. Other common chain transfer agents are hypophosphites, bisulfites, halogenated hydrocarbons such as carbon tetrabromide, and alcohols. These also add to the cost of the process, introduce undesired functionally to the polymer, can introduce salts into the product, and may necessitate an additional product separation step to remove the chain transfer agent from the reaction mixture.

Another way of lowering the molecular weight of the polymers product is by increasing the amount of free radical initiator. This approach adds considerably to the cost of production and may result in polymer chain degradation, crosslinking, and high levels of unreacted initiator remaining in the product. In addition, high levels of initiator may also result in high levels of salt by-products in the polymer mixture which is known to be detrimental to polymer performance in many applications. The same is true for chain stopping agents such as sodium metabisulfite. Among the preferred free-radical initiators for aqueous polymerization is hydrogen peroxide. It is relatively inexpensive, has low toxicity, and does not produce detrimental salt by-products. However, hydrogen peroxide does not decompose efficiently at conventional polymerization temperatures, that is less than about 100° C., and large amounts must be used to generate enough radicals to carry out a polymerization.

High levels of metal ions together with high levels of free radical initiator have also been tried as means for controlling molecular weight. This method is taught in U.S. Pat. No. 4,314,044 where the ratio of initiator to metal ion is from about 10:1 to about 150:1 and the initiator is present from about 0.5 to about 35 percent based on the total weight of the monomers. Such an approach is unsuitable for some products, such as water treatment polymers, which can not tolerate metal ion contaminants in the polymer product. In addition, the product is usually discolored due to the presence of the metal ions.

The following references are also of interest: U.S. Pat. Nos. 3,682,875; 3,879,360; 3,954,722; 4,201,848; 4,542,182; 4,581,429; 4,777,230; 5,059,657; 5,173,551; 5,191,008; 5,191,009; 5,194,496; 5,216,096; and 5,247,024.

In homoacrylate polymerization reaction processes of the prior art, various significant problems exist, for example difficulties in predicting or controlling both the polydispersity and modality of the polymers produced. These acrylate polymerization processes produce polymers with high weight average molecular weights ($M_w$) and low number average molecular weights ($M_n$) resulting in broad polydispersities or low molecular weight ($M_n$) and in some instances low conversion. Further, acrylate polymerization processes of the prior art are prone to generating excessive quantities of heat since the polymerization reaction is exothermic. As the viscosity of the reaction medium increases dissipation of heat becomes more difficult. This is referred to as the Trommsdorff effect as discussed and illustrated in *Principles of Polymerization*, G. Odian, 2nd Ed., Wiley-Interscience, N.Y., 1981, page 272, the disclosure of which is entirely incorporated herein by reference. This is particularly the situation for reactions with high concentrations of soluble monomer, for example greater than 30 to 50 percent by weight soluble monomer, which are conducted in large scale reactors with limited surface area and limited heat dissipation capacity. Moreover, the exothermic nature of free radical acrylate polymerization processes is often a limitation that severely restricts the concentration of reactants or the reactor size upon scale up.

Further, gel body formation in conventional free radical polymerization processes may result in a broad molecular weight distributions and/or difficulties encountered during filtering, drying and manipulating the product resin, particularly for highly concentrated reactions.

These and other disadvantages are avoided, or minimized with the homoacrylate and copolymeric acrylate polymerization processes of the present invention.

Thus, there remains a need for homoacrylate acrylate polymerization processes for the preparation of narrow polydispersity polymeric resins containing homoacrylate segments by economical and scalable free radical polymerization techniques and which polymers retain many or all of their desirable physical properties, for example, hardness, low gel content, processability, clarity, high gloss durability, and the like, while avoiding the problems of gel formation, exotherms, volume limited and multi-stage reaction systems, purification, performance properties of the polymer resin products, and the like, associated with prior art free radical acrylate polymerization methodologies.

The homoacrylate and copolymeric acrylate polymerization processes and homoacrylate containing thermoplastic resin products of the present invention are useful in many applications, for example, as a variety of specialty applications including toner and liquid immersion development ink resins or ink additives used for electrophotographic imaging processes or where monomodal or mixtures of monomodal narrow molecular weight resins or block copolymers with narrow molecular weight distribution within each block component are suitable for use, for example, in thermoplastic films and aqueous or organic solvent borne coating technologies.

SUMMARY OF THE INVENTION

An object of the present invention is to provide acrylate polymerization processes and polymers therefrom that overcome many of the problems and disadvantages of the aforementioned prior art.

In another object of the present invention is provided homoacrylate and copolymeric acrylate polymerization processes for the preparation of homoacrylate and block copolymeric homoacrylate containing resins.

In another object of the present invention is provided, in embodiments, a polymerization process for the preparation of homopolymeric acrylate containing thermoplastic resin or resins comprising heating a mixture comprised of a free radical initiator, an oxo nitroxide stable free radical agent, at least one polymerizable acrylate monomer compound, and optionally a solvent, to form a homopolymeric acrylate containing thermoplastic resin or resins with a high monomer to polymer conversion and a narrow polydispersity.

It is also an object of the present invention to provide homoacrylate and copolymeric acrylate polymerization processes for the production of diblock and multiblock homopolymeric acrylate or in the attentive homoacrylate containing polymers with high monomer to polymer conversion and a narrow polydispersity.

It is a further object of the present invention to provide acrylate polymerization processes which do not require the use of water or organic solvents, or chain transfer agents as a means of controlling the molecular weight of the resulting polymers.

Another object of this invention is to provide homoacrylate and copolymeric acrylate polymerization processes which result in acrylate containing polymeric resin products having number average molecular weights above 1,000.

Another object of this invention is to provide homoacrylate containing polymer mixture having number average molecular weights above about 1,000 to about 200,000 and a polydispersity from about 1.0 to about 2.0.

Another object of this invention is to provide a polymer or polymer mixtures having sufficiently low polydispersity properties and high monomer conversions such that residual monomer levels are low and are within industrially acceptable levels.

Another object of the present invention is to provide an acrylate polymerization reaction system which affords narrow polydispersity homopolymeric or copolymeric thermoplastic resin products containing homopolymeric acrylate segments in high yield.

Another object of the present invention is to provide a polymerization reaction system which may be conducted in the presence of a minimum amount of conventional reaction media such as water and mixtures of water and water miscible organic solvents.

In yet another object of the present invention, coupling or disproportionation termination reactions are minimized by reversibly terminating the propagating free radical chains with an oxo nitroxide stable free radical agent which both enables and serves to moderate the exothermicity and modality properties of the acrylate polymerization process.

In another object of the present invention is provided the acceleration of the dissociation of the free radical peroxide initiator by the addition of promoter compounds which include, for example, tertiary amines, which ensure that all polymeric chains are initiated nearly simultaneously or at about the same time.

In another object of the present invention is the addition of small amounts of organic acids, for example, sulfonic or carboxylic acids, to the reaction medium to alter the normal rate of acrylate monomer reaction without broadening the polydispersity of the polymeric resins and without inducing autopolymerization effects.

Still another object of the present invention is to prepare water soluble homoacrylate containing thermoplastic resins by single pot processes employing suitable monomer or monomers, free radical initiator, optional minimal amounts of an emulsifier or surfactant which may provide rate enhancement or simplify isolation, but avoids emulsification or phase separation during the polymerization, and an oxo nitroxide stable free radical agent.

Another object of the present invention is to prepare homoacrylate containing resins using polymerization processes wherein the molecular weight of the growing polymer or copolymer chains increase over the entire time period of the polymerization reaction and wherein the percent conversion or degree of polymerization of monomer to polymer with respect to time or number average molecular weight is approximately linear, that is, polymerization processes which occur without the aforementioned Trommsdorff effect.

Still another object of the present invention is to provide acrylate polymerization processes for the preparation of homoacrylate containing resins with narrow polydispersity properties and which polymerization processes are accomplished in a time efficient and economic manner by the optional addition of dialkyl sulfoxides, such as dimethyl sulfoxide (DMSO), which promoter compounds result in greater narrowing of the polymer product polydispersity. The dialkyl sulfoxide additives are preferably liquid at the polymerization reaction temperature and may be used in amounts for about several tenths of a weight percent of the total reaction mixture, to use in amounts as the exclusive reaction solvent or reaction media.

Other objects of this invention will be apparent to those skilled in the art in light of the present disclosure and appended claims.

DETAILED DESCRIPTION OF THE INVENTION

The present invention provides acrylate polymerization processes for preparing homoacrylate containing polymeric resins with well defined molecular weight properties and narrow polydispersities. The processes can be run as batch, semi-continuous or continuous processes. The processes provide for from about 5 to about 99 percent by weight of the reaction mixture to be acrylate monomer or monomer mixtures and the processes are conducted at from about 100° C. to about 180° C. The processes produce polymer products having low, intermediate, or high molecular weight, narrow polydispersity, and low residual salt content or are salt free.

In embodiments, the present invention overcomes the problems and disadvantages of the prior art acrylate polymerization processes by forming narrow polydispersity polymeric resins by means of, for example, a polymerization process for the preparation of homopolymeric acrylate containing thermoplastic resin or resins comprising heating a mixture comprised of a free radical initiator, an oxo nitroxide stable free radical agent, at least one polymerizable acrylate monomer compound, and optionally a solvent, to form a homopolymeric acrylate containing thermoplastic resin or resins with a high monomer to polymer conversion and a narrow polydispersity. As used herein, the term "homoacrylate containing" refers to, for example, that about 5 to 100 weight percent of the total monomer polymerized is an acrylate type monomer, and that the acrylate monomers polymerized in the presence of the oxo-nitroxide stable free radical compound are substantially contiguous or homopolymer segments.

In embodiments, the present invention provides an acrylate polymerization process for the preparation of homoacrylate containing thermoplastic resin or resins comprising heating from about 100° to about 180° C. for a time period of about 30 minutes to about 10 hours a mixture comprised of a free radical initiator, an oxo nitroxide stable free radical agent, and at least one polymerizable acrylate monomer compound to form a homoacrylate containing thermoplastic resin; cooling the solution; and optionally isolating, washing, and drying the resulting homoacrylate containing thermoplastic resin, wherein the thermoplastic resin possesses a narrow polydispersity of from about 1.0 to about 2.0, and preferably from about 1.0 to about 1.5, a modality of 1, and wherein a monomer to polymer conversion of from about 10 to about 100 percent is achieved.

The foregoing process can, in embodiments, be expanded to enable the formation of bimodal or multimodal homoacrylate containing thermoplastic resins by for example, adding to the aforementioned homoacrylate containing thermoplastic resin or resins a second mixture comprised of a free radical initiator, a stable free radical agent, and at least one polymerizable monomer compound, wherein the polymerizable monomer compound of the second mixture contains the same or different monomer components from the polymerizable monomer compound of the original mixture, and the free radical initiator and the stable free radical agent of the second mixture are the same or different from the free radical initiator and the stable free radical agent of the first mixture, and wherein there is formed a combined mixture; heating the combined mixture to form a third mixture comprised of a mixture of thermoplastic resins comprised of a first product resin formed from the first thermoplastic resin and added the second monomer, and a second product resin formed from the second monomer; cooling the third mixture; optionally isolating the mixture of thermoplastic product resins from the third mixture, wherein the first product resin and the second product resin each possess a narrow polydispersity. The resulting mixture of thermoplastic resins possesses a modality of 2. Higher modalities, for example, of from 3 to about 20 can be conveniently achieved, if desired, by the subsequent addition of additional fresh mixtures of monomer, free radical initiator, and stable free radical agent prior to a final cooling and isolation step. The resulting resins in the foregoing process, in embodiments can be, for example, a bimodal mixture of a first product resin comprising a diblock copolymer comprised of a first homoacrylate segment containing a block derived from a first acrylate monomer and a second block arising from the second monomer mixture, and a second product resin comprised of a homopolymer derived from substantially only the second monomer mixture. In a specific example, reaction by heating a mixture of n-butyl acrylate, AIBN free radical initiator, and 4-oxo-2,2,6,6-tetramethyl-1-piperidinyloxy free radical affords a first product resin of poly(n-butylacrylate); further addition of a second monomer such as styrene and additional free radical initiator and stable free radical compound followed by or along with heating provides the product resins of poly(n-butylacrylate-b-styrene) and homopolystyrene, wherein the homopolystyrene product is of comparable molecular weight as the styrene block segment incorporated into the accompanying butyl acrylate-styrene copolymer.

In other embodiments of the present invention, there are provided acrylate polymerization processes for the preparation of homoacrylate containing diblock thermoplastic resin comprising: adding to aforementioned first formed thermoplastic resin, either in situ or in a separate reaction vessel, a second mixture containing only monomer comprised of at least one polymerizable monomer compound, wherein the polymerizable monomer compound of the second mixture contains different monomer components from the polymerizable monomer compound of the first polymerized mixture, and wherein there is formed a combined mixture; heating the combined mixture to form a third mixture comprised of a homoacrylate containing diblock copolymer thermoplastic resins comprised of a first product resin formed from the first thermoplastic resin and the second monomer; cooling the third mixture; optionally isolating the diblock copolymer thermoplastic resin product from the third mixture and wherein the diblock copolymer thermoplastic resin possesses a narrow polydispersity.

In still other embodiments of the present invention, there are provided homoacrylate and copolymeric acrylate polymerization processes for the preparation of homoacrylate containing monomodal multiblock copolymer thermoplastic resin comprising: heating a first mixture comprised of a free radical initiator, a stable free radical agent, and at least one polymerizable monomer compound to form a first intermediate product resin; adding to the first intermediate product resin a second mixture comprised of at least one polymerizable acrylate monomer compound, wherein the polymerizable acrylate monomer compound of the second mixture is different from the polymerizable monomer compound of the first mixture, to form a combined mixture; heating the combined mixture to form a third mixture comprised of a block copolymer thermoplastic resin comprised of a first product resin formed from the first intermediate product resin and added the second monomer; cooling the third mixture; and sequentially repeating the preceding steps of adding, heating and cooling, N times, to form a fourth mixture containing a multiblock copolymer thermoplastic resin having N+2 blocks and wherein N is a number representing the number of times the sequence is repeated, and wherein the homoacrylate containing multi-block copolymer thermoplastic resin possesses a narrow polydispersity and a modality of 1. Added monomers can be water soluble, water insoluble, or of intermediate solubility. Judicious selection of the water solubility properties of added monomers and the resulting polymeric segment(s) enables convenient synthetic routes to block and multiblock copolymers with narrow polydispersities that are useful, for example, as surfactants and emulsifiers.

In yet other embodiments of the present invention, there are provided processes for polymerizing acrylate monomers comprising: (a) forming a reaction mixture by feeding into a reactor containing water or solutions of water miscible cosolvent; (i) one or more acrylate monomers solutions or suspensions thereof; (ii) an oxo nitroxide stable free radical, or a solution thereof; and (iii) a free radical initiator, or a solution thereof, in an effective amount for initiating polymerization of the monomers; and (b) heating the reaction mixture from about 100° C. to about 180° C. to form a homoacrylate or copolymeric acrylate containing resin with a narrow polydispersity and high conversion. This process embodiment can be accomplished by adding one or more acrylate monomers, a free radical initiator, and an oxo nitroxide stable free radical simultaneously or sequentially in the order (i), followed by (ii), then followed by (iii).

One class of carboxylic acid or acrylic monomers suitable for use in the present invention are $C_3$–$C_6$ monoethylenically unsaturated monocarboxylic acids, and the alkali metal and ammonium salts thereof. The $C_3$–$C_6$ monoethylenically unsaturated monocarboxylic acids include acrylic acid, methacrylic acid, crotonic acid, vinylacetic acid, and acryloxypropionic acid. Acrylic acid and methacrylic acid are the preferred monoethylenically unsaturated monocarboxylic acid monomers.

Another class of carboxylic acid monomers suitable for the present invention are $C_4$–$C_6$ monoethylenically unsaturated dicarboxylic acids and the alkali metal and ammonium salts thereof, and the anhydrides of the cis dicarboxylic acids. Suitable examples include maleic acid, maleic anhydride, itaconic acid, mesaconic acid, fumaric acid, and citraconic acid. Maleic anhydride and itaconic acid are preferred monoethylenically unsaturated dicarboxylic acid monomers.

The acid monomers useful in this invention may be in their acid forms or in the form of the alkali metal or ammonium salts of the acid. Suitable bases useful for neutralizing the monomer acids include sodium hydroxide, ammonium hydroxide, potassium hydroxide, and the like. The acid monomers may be neutralized to a level of from 0 to 50 percent and preferably from 0 to about 20 percent. More preferably, the carboxylic acid monomers are used in the completely neutralized form. Partial neutralization of the carboxylic acid monomers minimizes or eliminates corrosion on parts of the reaction equipment, but conversion of the monomers into polymer product may be diminished. The acidic or labile proton containing monomers may be neutralized prior to, during, or after polymerization. The polymer products are often particularly useful in their partially or completely neutralized form.

In addition, up to 50 percent by weight of the total polymerizable monomers may be monoethylenically unsaturated carboxylic acid-free monomers. Suitable monoethylenically unsaturated carboxylic acid-free monomers must be copolymerizable with the carboxylic monomers. Typical monoethylenically unsaturated carboxylic acid-free monomers which are suitable for this invention include alkyl esters of acrylic or methacrylic acids such as methyl acrylate, ethyl acrylate, butyl acrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, dimethylaminoethyl acrylate, dimethylaminoethyl methacrylate, phosphoethyl methacrylate, N-vinylpyrrolidone, N-vinylformamide, N-vinylimidazole, vinyl acetate, styrene, hydroxylated styrenes, styrenesulfonic acid and salts thereof, vinylsulfonic acid and salts thereof, and 2-acrylamido-2-methylpropanesulfonic acid and salts thereof.

Monomers, polymers and copolymers of the present invention can, in embodiments be separated from one another or from the polymerization reaction mixture by, for example, changing the pH of the reaction media and other well known conventional separation techniques.

Other suitable comonomers include acrylamides, alkyl and aryl amide derivatives thereof, and quaternized alkyl and aryl acrylamide derivatives.

Suitable initiators for the processes of the present invention are any conventional free radical initiators which have a half-life of at least 1 second at the polymerization temperature. Preferably, the initiator will have a half life of from about 10 second to about 2 hours, more preferably from about 10 seconds to about 10 minutes at the reaction temperature. These initiators include, but are not limited to oxygen, hydrogen peroxide, certain alkyl hydroperoxides, dialkyl peroxides, peresters, percarbonates, peroxides, persulfates and azo initiators. Specific examples of some suitable initiators include hydrogen peroxide, t-butyl hydroperoxide, di-tertiary butyl peroxide, tertiary-amyl hydroperoxide, potassium persulfate, and methylethyl ketone peroxide. The initiators are normally used in amounts of from about 0.05 percent to about 33 percent based on the weight of total polymerizable monomer. A preferred range is from about 0.5 to about 20 percent by weight of the total polymerizable monomer.

Redox initiators may also be used. These initiators include, but are not limited to, sodium bisulfite, sodium sulfite, isoascorbic acid, sodium formaldehyde-sulfoxylate, and the like, used with suitable oxidizing agents, such as the thermal initiators noted above. If used, the redox initiators may be used in amounts of 0.05 percent to 16 percent, based on the weight of total monomer. A preferred range is from about 0.5 to about 5 percent by weight of total monomer. Many of these initiators introduce salt by-products into the aqueous polymer product. It is preferred that the level of these initiators, if used, be minimized.

The stable free radical selected for use in the present invention may be any known stable free radical agent which enables the objects of the present invention to be achieved. The aforementioned copending applications and commonly assigned patents disclose various stable free radical agents. Examples of stable free radical compounds which are suitable for use in moderating the polymerization of free radical reactive monomers include: 2,2,6,6-tetramethy-1-piperidinyloxy free radical (TEMPO), compound 1; 4-hydroxy-2,2,6,6-tetramethy-1-piperidinylxoy free radical, compound 2; 2,2,5,5-tetramethyl-1-pyrrolidinlyoxy, compound 3; 3-carboxy-2,2,5,5-tetramethyl-1pyrrolidinyloxy, compound 4; and ditert-butyl nitroxide, compound 5, shown in the accompanying scheme. However, surprisingly and unexpectedly, the aforementioned stable free radical, compounds 1 to 5, and related derivatives, while quite satisfactory for the purpose of moderating the polymerization of a wide variety of different monomer types and comonomers, these compounds were completely ineffective when used in homopolymerizations of acrylate monomers. That is, no homopolymeric product formation could be detected by GPC when, for example, a mixture of n-butylacrylate, a free radical initiator such as benzoyl peroxide or AIBN, and a stable free radical

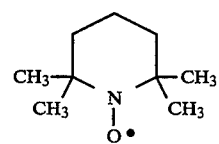

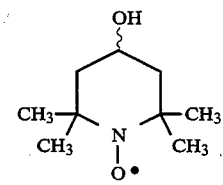

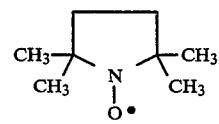

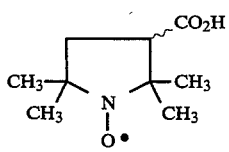

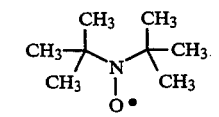

compound of the type 1–4 were heated for about 10 hours at about 140° C. Apparently, the homopolymer of butylacrylate was sufficiently thermally unstable or the stable free radical compound had a sufficiently strong inhibitory effect under the reaction conditions so as to preclude homoacrylate polymer product formation. A solution to the problem of forming acrylate homopolymers and homopolymeric acrylate containing thermoplastics was achieved by substituting, for example, the carbonyl containing stable free radical 4-oxo-2,2,6,6-tetramethyl-1-piperidinyloxy, (4-oxo-TEMPO) compound 6, in place of the aforementioned ineffective stable free radical compounds.

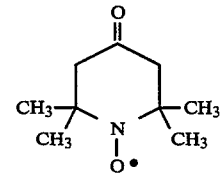

Molecular modeling of the stable free radical polymerization system has been performed by employing semi-empirical molecular orbital calculations. Two different semi-empirical Hamiltonians have been used; AM1 and PM3, which differ in the paramertization of the equations to calculate the heat of formation for the various components in each nitroxide system. These calculations predict that in the living free radical polymerization, the bond dissociation energy between the oxygen atom of the nitroxide radical and the carbon atom at the end of the propagating chain must be less than 35 kcal per mole in order to achieve reasonable rates of chain growth. This data is illustrated in the accompanying table. Although not desired to be limited by theory, the calculations suggest that the lower the bond dissociation energy the more labile is the C—O bond and the reaction should proceed at a faster rate. In addition, the calculations also correctly predict that stable nitroxide radicals have an endothermic enthalpy of reaction with styrene monomer and thus are

| Compound | AM1 Bond Dissociation Energy (kcal/mol) | PM3 Bond Dissociation Energy (kcal/mol) |
|---|---|---|
| 1 | 22.248 | 25.857 |
| 2 | 22.616 | 29.001 |
| 3 | 29.447 | 27.662 |
| 4 | 16.592 | 22.008 |
| 5 | 19.332 | 24.379 | incapable of initiating new polymer chains which is a requirement for a living polymerization system to give narrow molecular weight distributions.

The inability to effectuate homopolymerization of a large number of acrylate type monomers using the aforementioned stable free radical compounds 1 to 5 was evident even after extensive variation and manipulation of reaction conditions, reactant substitutions, and reagent ratio adjustments.

Hydrophilic stable free radical compounds are known, for example U.S. Pat. No. 5,264,204, discloses a magnetic resonance organ and tissue imaging method using these compounds, and a number of other suitable stable free radical compounds are available commercially and are readily accessible synthetically, for example, as disclosed in "Synthetic Chemistry of Stable Nitroxides", by L. B. Volodarsky et al., CRC Press, 1993, ISBN:0-8493-4590-1, the disclosures of which are incorporated by reference herein in their entirety.

The monomers of the present invention can be polymerized in a variety of polymerization reaction media. The reaction mixture may contain from about 95 to about 98 percent by weight, preferably from about 20 to about 90 percent by weight, and most preferably from 25 to about 85 percent by weight acrylate monomer with the balance comprised of other reactants, reagents, comonomers, and optional solvents or diluents.

The acrylate polymerization of the present invention reactions can be supplemented with a solvent or cosolvent to help ensure that the reaction mixture remains a homogeneous single phase throughout the monomer conversion. Any solvent or cosolvent may be selected so long as the solvent media is effective in providing a solvent system which avoids precipitation or phase separation of the reactants or polymer products until after all polymerization reactions have been completed. Exemplary solvent or cosolvents useful in the present invention may be selected from the group consisting of polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL® or CELLOSOLVE®, amino alcohols, ketones, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

Temperature of the polymerization may range from about 100° C. to about 180° C., preferably from about 110° C. to about 175° C. At temperatures below about 100° C., the reaction rate is slow and industrially impractical without the aid of an acid or base accelerating additive compound. At temperatures above about 180° C., conversion of the monomer into polymer decreases and uncertain and undesirable by-products are formed. Frequently, these by-products discolor the polymer mixture and may necessitate a purification step to remove them or they may be intractable.

Since solvent and cosolvent admixtures can be used as the reaction media, the elevated temperatures of the polymerization require that the polymerization reactor be equipped to operate at elevated pressure. In general, it is preferred to conduct the polymerization at from about 10 to about 2,000 pounds per square inch (psi), and more preferably at from about 50 to about 1,000 psi.

The molecular weights referred to are measured by gel permeation chromatography using, for example, a polyethylene oxide standards for water soluble polymers and polystyrene standards for organic soluble polymers unless specifically stated otherwise.

Although not being desired to be limited by theory, it is believed that when polymerization reaction processes of the present invention are performed at a temperature at about or above 100° C., the exact temperature depending on the initiator used, all the polymer chains are expected to be initiated at about the same time. This is believed to be an important feature in forming polymer chain products having narrow polydispersities.

The aforementioned undesirable chain coupling or disproportionation termination reactions, so prevalent under the conditions of conventional art free radical polymerization systems, is believed to be suppressed under the conditions of the present invention because the effective instantaneous concentration and availability of living free chains is extremely small. In addition, stable free radical agents of the instant invention do not initiate polymerization so that new chains are not initiated after an initial period during which all polymer chains are initiated at about the same time.

Propagating chains of the present invention are referred to as pseudoliving because the stable free radical agent adds to a propagating chain and the chain is temporarily, but reversibly, terminated, reference the aforementioned U.S. Pat. No. 5,322,912 the disclosure of which is incorporated by reference herein in its entirety. The term "protected" as used therein refers, for example, to the availability of chain radical species for selective rather than indiscriminant further reaction with monomer. An unmoderated free radical polymerization chain, that is, a free radical polymerization process without a stable free radical agent present, in contrast, has a reactive or "open" chain end throughout its lifetime which is typically irreversibly terminated on the order of seconds.

The present invention provides several specific advantages in embodiments as follows.

With the process of the present invention, polymer product polydispersities can be varied from between approximately 1.0 to approximately 2.0 or higher if desired depending on the monomer/comonomer system by varying the ratio of stable free radical agent to free radical initiator molar concentration. When the polymerization process conditions of the present invention are attempted with nonacrylate type monomers without using the a stable free radical (SFR) additive, considerably broader molecular weight resins are obtained. In the situation where acrylate monomers are used with a stable free agent which does not possess an oxygen ring substitutent, no polymeric homoacrylate products could be formed.

The oxo nitroxide stable free radical agent moderated acrylate polymerization reactions of the present invention can be performed in a variety of reaction media including bulk, solution, aqueous or organic emulsion, suspension, phase transfer, or reactive extrusion.

During the reaction of acrylate monomer or mixtures of acrylate monomers to form polymers, the reaction time may be varied over about 1 to 60 hours, preferably between about 2 to 10 hours and optimally about 3 to 7 hours. The optimal reaction time may vary depending upon the temperature, the volume and scale of the reaction, and the quantity and type of polymerization initiator and stable free radical agent selected.

The polymerization reaction temperature is kept relatively constant throughout the heating step by providing an adjustable external heat source and the temperature is from about 60° C. to about 180° C., and preferably between 100° C. and 160° C. and optimally in embodiments about 130° C. to 160° C. Reactions performed above 200° C. tend to result in a broadening of the polydispersity. A reaction volume may be selected for any size that enables simple adding, mixing, reacting and isolating the product resins on an economic or convenient scale.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like. The initiator concentration employed is about 0.2 to about 16.0 weight percent of the total weight of monomer to be polymerized and is determined by the desired molecular weight of the resin. As the initiator concentration is decreased relative to the weight or molar equivalents of monomer used, the molecular weight or the thermoplastic resin product increases.

Water soluble free radical initiators can be optionally employed in the processes of this invention and are those that are traditionally used in aqueous polymerization. Examples of water soluble free radical initiators are: persulfates; water soluble peroxides and hydroperoxides; more specifically, sodium, potassium and ammonium persulfate; peroxides such as hydrogen peroxide, t-butyl hydroperoxide, cumene hydroperoxide, paramenthane hydroperoxide; and peroxy carbonates. Other water soluble initiators of similar decomposition mechanism may be used if desired.

A preferred initiator is one which has a one-hour half-life at about 60° to 95° C. and a ten-hour half-life at about 50° to 80° C. Other peroxides, such as peresters and peracids having somewhat higher one-hour half-life/temperature relationships, may also be used if they are accompanied by a promoter compound such as tertiary amine. Such initiators are, for example: 2,4-dimethyl-2,5-dibenzyl peroxyhexane (138° C.), tert-butyl peroxybenzoate (125° C.), di-tert-butyl diperoxyphthalate (123° C.), methyl ethyl ketone peroxide (133° C.), dicumyl peroxide (135° C.) tert-butyl peroxycrotonate (118° C.), 2,2-bis-t-butyl(peroxybutane) (119° C.), tert-butylperoxy isopropyl carbonate (119° C.), 2,5-dimethyl-2,5-bis(benzoylperoxy)-hexane (118° C.), t-butyl peracetate (120° C.), di-t-butyldiperoxy-phthalate (123° C.), and the like. The figures in parentheses are the 1 hour half-life temperatures.

Still other initiators may also be employed if accompanied by a promoter compound in versions of this process, for example, 2,4-pentanedione peroxide (167° C.), di-t-butyl peroxide (149° C.), 2,5-dimethyl-2,5-di(t-butylperoxy)-hexyne (149° C.), 2,5-dimethyl-2,5-di(t-butylperoxy)hexyne (149° C.), 2,5-dimethyl-2,5-di(t-butylperoxy) hexane (138° C.), and the like.

Preferred initiator compounds are: t-butyl peroxy isobutyrate (120° C.); t-butyl peroxy 2-ethylhexanoate (95° C.); t-butyl pivalate (76° C.); and t-amyl peroxy 2-ethyl hexanoate (92° C.). Particularly preferred free radical initiators are azobisalkylnitrile and diaroyl peroxide compounds.

The monomer or monomers to be polymerized can be dissolved in water or aqueous mixtures of polar protic or aprotic organic solvents. The resultant aqueous solution usually contains a suitable water-soluble, free-radical generating initiator such as a peroxide or a persulfate, and the like, as defined above. The monomer or monomers are used in effective amounts relative to the free radical initiator, and stable free radical agent, as defined hereinafter.

The stable free radical agent used for polymerizing nonacrylate monomers or comonomers can be any stable free radical and includes nitroxide free radicals, for example, PROXYL (2,2 5,5-tetramethyl-1-pyrrolidinyloxy) and derivatives thereof, DOXYL (4,4-dimethyl-3-oxazolinyloxy) and derivatives thereof, and TEMPO (2,2,6,6-tetramethyl-1-piperidinyloxy) and derivatives thereof, and the like. These stable free radical agent materials are well known in the literature, for example G. Moad et.al., *Tetrahedron Letters*, 22, 1165 (1981) as free radical polymerization inhibitors. Other suitable nitroxides used for polymerizing nonacrylate monomers or comonomers are di-tert-butyl nitroxide and related di-tertiary alkyl substituted nitroxides. However, under the polymerization conditions of the present invention, the stable free radical agents function not as inhibitors but as moderators to harness the normally highly reactive and indiscriminate propagating intermediate free radical polymer chain species. The stable free radical agents are preferably soluble in the monomer phase, if more than a single is present, where predominantly all the polymerization of monomers occurs. Stable free radical agents which have limited monomer solubility are still useful, but may require a monomer miscible cosolvent or else these stable free radical compounds tend to result in less predictable polymerization processes. If the stable free radical agent separates out of the monomer phase to any great extent then the balance desired between the mole ratio of the stable free radical agent, free radical initiator, and propagating free radical polymer chain species may be upset.

The molar ratio of the stable free radical (SFR) agent to free radical initiator (INIT) residing in the monomer phase is from about 0.5 to 5.0, and preferably in the range from about 0.4 to 4.0. Although not wanting to be limited by theory, in an embodiment, the molar ratio [SFR:INIT.] of stable free radical agent, for example, 4-oxo TEMPO, to free radical initiator, for example, AIBN, is about 2.0 and is believed to be important for success of the process. If the [SFR:INIT.] is too high then the reaction rate is noticeably inhibited. If the [SFR:INIT.] is too low then the reaction product has undesired increased polydispersity. It should be noted that when acrylic acid or acrylate ester compounds are polymerized to polyacrylate derivatives without the stable free radical agent of the present process, the product polymers isolated have polydispersities in excess of 2.0 and above.

In embodiments, the molar ratio of monomer content to stable free radical agent to free radical initiator is from about 6.0:0.2:1 to about 10,000:2.5:1 and preferably in the range of about 125:2.0:1 to about 7,000:1.3:1.

Processes of the present invention, in embodiments, provide for selective low, intermediate, and high monomer to polymer conversion rates, or degrees of polymerization, and preferably, for example, of 90 percent by weight or greater.

The low weight average molecular weight resin products having narrow polydispersity properties, as is also the situation with intermediate and high molecular weight products of the present invention, may be obtained without the use of a chain transfer agent.

Processes of the present invention, in embodiments provide for relatively high weight average molecular weights, from weight average molecular weights ranging in size of from about 2,000 to about 200,000 while delivering narrow polydispersity products.

The acrylate monomers and non-acrylate monomers and comonomers that can be used in the present invention are any monomer capable of undergoing a free radical polymerization and include but are not limited to styrene, substituted styrenes and derivatives thereof, for example, hydroxylated and methylated styrenes, acrylates, butadiene and any conjugated diene monomer sufficiently reactive under the specified stable free radical moderated polymerization reaction conditions to afford a stable free radical reaction adduct and subsequently high molecular weight polymer products, for example, polymers of n-butyl acrylate, acrylic acid, and the like.

The polymerization reaction rate of the monomers may, in embodiments, be inhibited or accelerated and the reaction time influenced by the addition of a minor amount of a protic acid selected from the group consisting of inorganic acids, such as sulfuric, hydrochloric, and the like, and organic sulfonic and carboxylic acids. Although no definitive trend is presently evident, the added acid may have a profound or very little effect on the polymerization rate, depending upon a variety of reaction variables and conditions. Excessive addition of inorganic and organic acid beyond equimolar amounts compared to the stable free radical agent causes the resin polydispersity to broaden. In embodiments, the protic acid source may be in the form of an effective acid functional group contained in either the stable free radical agent or in the free radical initiator compound.

By cooling the polymerization reaction to below 60° to 80° C., the stable free radical moderated polymerization process is effectively quenched or terminated. Each new or subsequent addition of mixtures containing monomer, stable free radical, and initiator, accompanied by heating provides a new polymeric species having a narrow molecular weight distribution and each new polymer species continues to grow independently of the other polymer species already established thereby providing the capability of forming well defined, narrow polydispersity, bimodal and multimodal polymer mixtures.

Alternatively, block copolymer resins may also be prepared whereby after each desired block has been formed a new monomer or monomers is added, without the addition of more initiator or stable free radical agent, to form a new block wherein each block component is well defined in length and has a narrow molecular weight distribution and having properties depending on the repeated sequence and the monomers chosen for incorporation. Monomers added subsequent to the formation of the first formed homoacrylate containing thermoplastic resin may be water soluble or water insoluble. Judicious selection of the water solubility properties of added monomers and the resulting polymeric segment enables convenient synthetic routes to block and multiblock copolymers with narrow polydispersities that are useful, for example, as surfactants, resin compatibilizers, viscosity modifies, and emulsifiers.

The polymeric products of the present invention may be optionally crosslinked with, for example, known crosslinking, coupling, or curing agents such as divinyl benzene and the like, either in situ or in a separate post polymerization process step.

Additional optional known additives may be used in the polymerization reactions which do not interfere with the objects of the invention and which may provide additional performance enhancements to the resulting product, for example, colorants, lubricants, release or transfer agents, surfactants, stabilizers, antifoams, antioxidants, and the like.

Polymer resins possessing a discrete mixture of monomodal, that is a well defined multimodal molecular weight distribution may in embodiments thereof provide several advantages, particularly for electrophotographic toner compositions such as: melt rheology properties including improved flow and elasticity; and improved performance properties such as triboelectrification, admix rates, and shelf life stabilities.

In the aforementioned U.S. Pat. No. 5,322,912, there is disclosed a monomer polymerized in bulk or in the absence of a solvent or diluent, that is neat, using a mixture of styrene monomer, a free radical initiator, and a stable free radical agent at constant temperature. A plot of weight percent monomer conversion versus number average molecular weight indicates that a nearly linear relationship holds for bulk polymerization reaction media using stable free radical agent moderated processes and which relationship is believed to be operative in the present invention. Thus, the Trommsdorff effect, that is, known exothermic heating or autoacceleration of the monomer conversion reaction rate and randomization of molecular weights observed in unmoderated free radical polymerization reactions is effectively suppressed in aqueous or nonaqueous polymerization processes of the present invention even at high solids content, high conversion, and elevated temperature free radical initiated polymerization reactions.

Toner compositions can be prepared by a number of known methods, such as admixing and heating resin particles obtained with the processes of the present invention such as water soluble styrene butadiene copolymer derivatives, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of suitable toner resins selected for the toner and developer compositions of the present invention include homoacrylate containing polyamides, styrene acrylates, styrene methacrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins in admixture with homoacrylate containing resins include styrene butadiene copolymers, mixtures thereof, and the like. Other preferred toner resins include styrene/n-butyl acrylate copolymers, PLIOLITES ®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0 1 weight percent to about 5 weight percent, and preferably from about 0.3 weight percent to about 1 weight percent.

Numerous well known suitable pigments or dyes can be selected as the colorant for the toner particles including, for example, carbon black like REGAL 330 ®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO \cdot Fe_2O_3$) including those commercially available as Mapico Black, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK ®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL ®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL ®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15 ® commercially available from Eastman Chemical Products, Inc., VISCOL 550-P ®, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The following Examples are being supplied to further define various species of the present invention, it being noted that these Examples are intended to illustrate and not limit the scope of the present invention. Parts and percentages are by weight unless otherwise indicated.

EXAMPLE I

Stable Free Radical Polymerization of Poly(n-butyl acrylate) n-Butyl acrylate (5 mL), AIBN (100 mg) and 4-oxo-TEMPO (84 mg) were mixed together and heated in an oil bath maintained at a temperature of 165° C., under argon, for 3.5 hours. Samples were removed at the time intervals indicated in the table below and analyzed by GPC. The molecular weights increased with time with no broading of the polydispersity.

| Sample | Reaction Time (hr) | $M_n(10^{-3})$ | $M_w(10^{-3})$ | Polydispersity |
|---|---|---|---|---|
| 1 | 1 | 553 | 857 | 1.55 |
| 2 | 2 | 1,091 | 1,562 | 1.43 |
| 3 | 3.5 | 1,340 | 1,911 | 1.43 |

EXAMPLE II

When Example I was repeated, with the exception that less AIBN initiator was used, there resulted a higher molecular weight homopolymer of poly(n-butyl acrylate) resin. Thus, when n-butyl acrylate (5 mL), AIBN (50 mg) and 4-oxo-TEMPO (84 mg) were mixed together and heated in an oil bath, under argon, for 4 hours, a resin with $M_n=2,486$, $M_w=3,641$, and PD=1.46 was obtained.

EXAMPLE III

When Example II is repeated, with the exception that about three times as much monomer was used, an even higher molecular weight poly(n-butyl acrylate) resin is obtained. Thus, when n-butyl acrylate (15 mL), AIBN (50 mg) and 4-oxo-TEMPO (84 mg) were mixed together and heated in an oil bath, under argon, for 9 hours, a resin with $M_n=9198$, $M_w=15,878$ and PD=1.73 was obtained. A wash with methanol removed some oligomers to yield a thick oil with $M_n=16,736$, $M_w=20,577$, and PD=1.23.

EXAMPLE IV

When Example II was repeated, with DMSO as a cosolvent a narrower polydispersity is obtained relative to a control. Thus, when n-butyl acrylate (10 mL), AIBN (50 mg) and 4-oxo-TEMPO (115 mg) were mixed together and heated in an oil bath, under argon, for 8 hours, a resin with $M_n=6577$, $M_w=8923$ and PD=1.36 was obtained. The same experiment conducted without DMSO present gave a polymer product with $M_n=4030$, $M_w=6953$, and PD=1.72

EXAMPLE V

Magnetic Toner Preparation and Evaluation The polymer resin (74 weight percent of the total mixture) obtained by the stable free radical polymerization processes in Example I may be melt extruded with 10 weight percent of REGAL 330 ® carbon black and 16 weight percent of MAPICO BLACK ® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972 ® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR ®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028 ® soft silicone roll fuser, operated at 7.62 cm (3 inches) per second.

The minimum fix and hot offset temperatures of stable free radical polymerization polymers having narrow polydispersities as toners are expected to be improved over toners prepared from resins synthesized by a free radical polymerization process without a stable free radical agent present affording broad polydispersities. The actual fuser roll temperatures may be determined using an Omega pyrometer and was checked with wax paper indicators. The degree to which a developed toner image adhered to paper after fusing is evaluated using a Scotch ® tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON ®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the polymer and copolymer resins of the present invention including colored toners, single component toners, multi-component toners, toners containing special performance additives, and the like.

The stable free radical agent moderated homoacrylate and copolymeric homoacrylate polymerization processes of the present invention may be applied to a wide range of acrylate organic monomers to provide novel toner resin materials with desirable electrophotographic properties. For example, homoacrylate containing the block copolymers have application as dispersents for photoreceptor pigments. The multimodal resins have application to low melt resins and certain monomodal resins may be used to modify the surface of carbon black and pigment particles to make the pigment particles more miscible with a host polymer or dispersing medium. Narrow molecular weight homoacrylate and copolymeric homoacrylate containing resins such as mixtures of poly(styrene-b-n-butyl acrylate) and poly(butyl acrylate) find application as improved toner resins for general application and particularly for detoning or deinking applications which may be achieved by heating at elevated temperatures in aqueous alkali solutions.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A polymerization process for the preparation of homopolymeric acrylate containing thermoplastic resin or resins comprising:

heating a mixture comprised of a free radical initiator, an oxo nitroxide stable free radical agent, at least one polymerizable alkyl acrylate monomer compound, to form a homopolymeric alkyl acrylate containing thermoplastic resin or resins with a high monomer to polymer conversion and a narrow polydispersity.

2. A process in accordance with claim 1 wherein the free radical initiator is selected from the group consisting of organic peroxides, organic persulfates, inorganic persulfates, peroxydisulfate, azobisalkylnitriles, peroxycarbonates, perborates, percarbonates, perchlorates, peracids, hydrogen peroxides, and mixtures thereof.

3. A process in accordance with claim 1 wherein the oxo nitroxide stable free radical agent is comprised of a nitroxide stable free radical selected from the group consisting of 4-oxo-2,2,6,6-tetramethyl-1-piperidinyloxy, free radical of the formula (I), and derivatives thereof

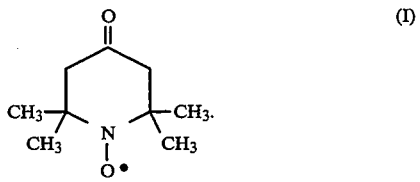

4. A process in accordance with claim 1 wherein the polymerizable acrylate monomer is a free radical reactive unsaturated compound selected from the group consisting of amine, carboxyl, aldehyde, alkyl, cyano, and hydroxyl substituted acrylic acids and acrylic acid esters having from 2 to about 20 carbon atoms; acrylamide; methacrylamide; acrylic acid; methacrylic acid; acrolein; dimethylaminoacrylate; hydroxy-lower alkyl, and amino-lower alkyl acrylates of the formula $CH_2=C(-R^1)-(C=Z)-R^2$ where $R^1$ is hydrogen, $R^2$ is selected from the group consisting of $-OR^1$ and $-NR^1_2$, and where Z is selected from the group consisting of oxygen and sulfur atoms.

5. A process in accordance with claim 4 wherein the monomer compounds do not polymerize in a controlled fashion to provide narrow molecular weight distribution resins in the absence of the stable free radical 4-oxo-2,2,6,6-tetramethyl-1-piperdinoxy compound.

6. A process in accordance with claim 1 wherein the heating is conducted under ambient pressure or at elevated pressure in a sealed vessel.

7. A process in accordance with claim 1 wherein the thermoplastic resin product has a polydispersity from about 1.0 to about 1.7 and a monomer to polymer conversion of 50 percent.

8. A process in accordance with claim 1 wherein the heating is accomplished in a period of time of from about 1 to about 60 hours at a temperature of from about 70° to about 200° C.

9. A process in accordance with claim 1 wherein said narrow polydispersity of said thermoplastic resin remains about constant throughout said polymerization process.

10. A process according according to claim 1 further comprising cooling the heated mixture to below 40° C. upon completion of the polymerization reaction.

11. A process according to claim 1 wherein the thermoplastic resin or resins produced therein are isolated.

12. A process according to claim 11 wherein the thermoplastic resin or resins produced therein are washed and dried upon isolation.

13. A process according to claim 1 wherein from about 2 to about 10 different monomers are polymerized.

14. A process in accordance with claim 1 further comprising adding one or more reaction solvents selected from the group consisting of polymer compatible aliphatic alcohols, glycols, ethers, glycol ethers, pyrrolidines, n-alkyl pyrrolidones, derivatives thereof, water, halogenated hydrocarbons, and mixtures thereof.

15. A process in accordance with claim 1 wherein the stable free radical agent to free radical initiator molar ratio is from about 0.4 to 2.5.

16. A process in accordance with claim 1 wherein the stable free radical agent to free radical initiator molar ratio is from about 0.9 to 2.0.

17. A process in accordance with claim 1 wherein the monomer to free radical initiator molar ratio is from about 100:1 to about 20,000:1.

18. A process in accordance with claim 1 wherein said monomer to polymer conversion is excess of about 90 percent by weight.

19. A process in accordance with claim 1 wherein said thermoplastic resin has a gel content of from 0.0 to less than about 5.0 weight percent.

20. A process in accordance with claim 1 wherein the weight average molecular weight ($M_w$) of the resin or resins are from 2,000 to 200,000.

21. A process in accordance with claim 1 wherein the heating is from about 100° to about 200° C. and wherein the incipient polymeric chains of said resin are formed simultaneously at from about 0 to 10 minutes after said heating has attained about 100° C.

22. A process in accordance with claim 1 further comprising adding an inorganic acid, organic sulfonic or organic carboxylic acid during heating of said mixture thereby increasing the rate of formation of said thermoplastic resin or resins from said polymerization of said monomer compound.

23. A process in accordance with claim 1 further comprising adding a tertiary amine promoter compound to said mixture thereby increasing or accelerating the rate of dissociation of said free radical initiator and wherein said free radical initiator is an organic peroxide.

24. A process in accordance with claim 1 wherein said thermoplastic resin or resins has a narrow polydispersity of from about 1.1 to about 2.0 and a monomer to polymer conversion of about 50 to about 90 percent.

25. A process in accordance with claim 1 wherein the molar ratio of monomer to stable free radical agent to free radical initiator is from about 100:0.2:1 to about 20,000:2.5:1.

26. A free radical polymerization process for the preparation of homopolymeric acrylate containing thermoplastic resin comprising:

heating from about 100° to about 200° C. for a time period of about 30 minutes to about 10 hours a mixture comprised of an azobisalkylnitrile free radical initiator, a nitroxide stable free radical agent 4-oxo-2,2,6,6-tetramethyl-1-piperdinoxy, and at least one polymerizable acrylate monomer compound to form said thermoplastic resin;

cooling said solution;

optionally isolating said thermoplastic resin; and optionally washing and drying said thermoplastic resin, wherein said thermoplastic resin possesses a narrow polydispersity from about 1.1 to about 1.7, a modality of 1, wherein said resin contains from about 5 to about 4,000 contiguously bonded acrylate monomer units, and wherein a monomer to polymer conversion from about 10 to about 100 percent is achieved.

27. A process in accordance with claim 1 further comprising including in the heated mixture a dialkyl sulfoxide additive which promotes further reduction in the polydispersity value of the homoacrylate containing thermoplastic resin or resins, wherein the sulfoxide is added in an amount from about 0.1 to about 100 weight percent of the reaction media.

28. A process in accordance with claim 1 wherein said heating is for a period of from about 30 minutes to 30 hours.

29. A process in accordance with claim 1 wherein the stable free radical agent to free radical initiator molar ratio SFR:INIT is from about 1.2 to 1.8.

30. A process in accordance with claim 1 wherein said free radical initiator has a half life of from about 5 seconds to about 10 minutes at above 100° C.

31. A process in accordance with claim 1 wherein said high conversion is from about 50 to 100 percent.

32. A process in accordance with claim 1 wherein said narrow polydispersity in from about 1.0 to about 1.7 and wherein said conversion is from about 10 to 100 percent.

33. A process in accordance with claim 1 wherein the thermoplastic resin product comprises from about 1.0 to about 95 percent by weight of the total weight of the polymerization mixture.

34. A process in accordance with claim 1, wherein the polymerization of the monomer to the resin product results in an acrylate containing resin with an $M_w$ of about 100,000 and occurs without a Trommsdorff effect, or in the alternative, substantial polymerization exotherm.

35. A process according to claim 1 wherein the process is conducted in a continuous, semicontinuous, or batch reaction scheme.

36. A process according to claim 1 wherein there results low molecular weight homoacrylate containing resin products with narrow polydispersity properties without the use of a chain transfer agent, and without a Trommsdorff effect, or in the alternative, without an autopolymerization effect.

* * * * *